UNITED STATES PATENT OFFICE.

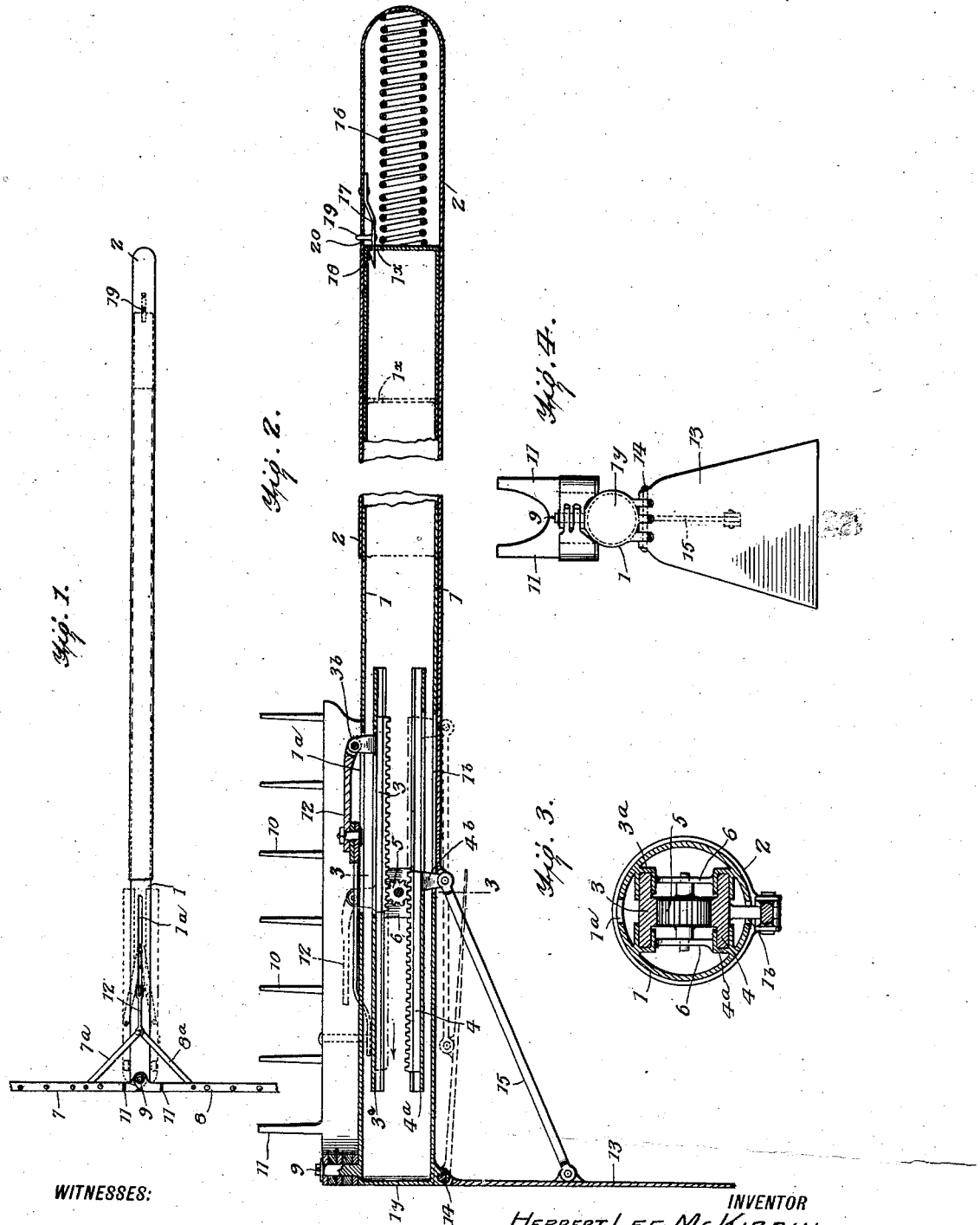

HERBERT LEE McKIBBIN, OF CLAYTON, MISSOURI.

COMBINED HOE AND RAKE.

987,008. Specification of Letters Patent. Patented Mar. 14, 1911.

Application filed August 10, 1910. Serial No. 576,476.

*To all whom it may concern:*

Be it known that I, HERBERT LEE MCKIBBIN, a citizen of the United States, and a resident of Clayton, in the county of St. Louis and State of Missouri, have made certain new and useful Improvements in Combined Hoes and Rakes, of which the following is a specification.

My invention relates to improvements in combined hoes and rakes and it consists in the combinations, constructions and arrangements herein described and claimed.

An object of my invention is to provide a combination tool having a rake member on one side thereof and a hoe member on the other side, each of said parts being capable of being folded back while the other is in use.

A further object of my invention is to provide a novel form of mechanism by which both parts may be operated simultaneously, one part coming into operative position, while the other part is folded back out of operative position.

A further object of my invention is to provide a handle having relatively movable parts by which the aforesaid operations can be effected.

Other objects and advantages will appear in the following specification and the novel features of the device will be particularly pointed out in the appended claims.

My invention is illustrated in the accompanying drawings forming part of this application in which similar reference characters denote like parts in the several views, and in which—

Figure 1 is a plan view of the device showing the rake member in its extended position. Fig. 2 is a central longitudinal section through the device showing the hoe member in its operative position. Fig. 3 is a transverse section along the line 3—3 of Fig. 2, and Fig. 4 is a face view of the device when the hoe member is in operative position.

In carrying out my invention I provide a handle comprising the parts 1 and 2. These parts are hollow as may be seen from Fig. 2. The part 1 bears within it the main operating mechanism which is best shown in Figs. 2 and 3. This consists of an upper rack member 3 and a lower rack member 4, both of said rack members being arranged to engage a common pinion 5. The upper rack member 3 is slidably carried in guides $3^a$ as shown in Fig. 3, while the lower rack member 4 is similarly carried in guides $4^a$, both of these guides being secured to the interior of the handle section 1. The pinion 5 is journaled in bearings 6 as shown in Fig. 3. Projecting upwardly through a slot $1^a$ in the handle section 1 is an arm $3^b$ which is integral with the upper rack member 3, while projecting downwardly through the slot $1^b$ of the handle section 1 is an arm $4^b$ which is integral with the lower rack member 4.

The rake member consists of two parts 7 and 8. These parts are pivotally secured on a pin 9 projecting from the handle 1. Both of the rake sections are provided with teeth 10, and each has a large tooth 11 near the center as clearly shown in the figure. Pivotally secured to the rake sections 7 and 8, are the links $7^a$ and $8^a$ (see Fig. 1), these being pivotally connected in turn with a link 12, which is pivotally connected to the arm $3^b$ which projects through the slot $1^a$.

On the opposite side from the rake is the hoe member 13, which is pivotally connected at 14 to the handle section 1. A link 15 pivotally connects the hoe member 13 with the end of the arm $4^b$.

Referring now to Fig. 2 it will be seen that there is a telescopic member 2 which comprises part of the handle. One end of the telescopic member 2 is connected with the arm $4^b$ while within the member 2 is a coil spring 16, which bears, at one end, on the closed end of the handle section 2, and at the other end on the closed end of the handle section 1. Within the hollow handle section 2 is a spring 17 which bears a catch 18, on one end, and is provided with a push pin 19, which projects through an opening 20 in the handle section 2. In the end of the handle section 1, is a similar opening $1^x$, through which the member 18 is arranged to move.

From the foregoing description of the various parts of the device the operation thereof may be readily understood. If the device is to be used as a hoe, the handle is grasped, and the end $1^y$ of the handle section is placed on the ground. Now by grasping the handle section 2 it may be forced downwardly thereby causing a movement of the rack 4 in the direction indicated by the arrow in Fig. 2. The hoe member 13 will then be swung downwardly into operative position. The movement of the rack 4 will cause the pivot 5 to revolve on its axis. This will move the rack member 3 in the opposite direction so as to cause the rake sections to fold into the position shown in Fig. 2. The device is held in this position by means of the engagement of the locking member 18 with the end of the handle section 1, the locking head 18 having passed through the opening 1ˣ. Now when it is desired to use the rake, the push pin 19 is pushed inwardly, thereby disengaging the locking head 18 from the end of the handle section 1, when the spiral spring will cause an outward movement of the handle section 2, thereby bringing the folded rake sections into operative position.

The appearance of the tool from the front when the hoe is being used is that shown in Fig. 4, while Fig. 1 shows the positions of the rake sections when the rake is being used. From Fig. 4 it will be seen that the two central teeth 11 of the rake are strengthened to provide digging members which may be used in the manner of a grub hoe.

The device described above is of simple operation and as will be seen, the rake members are folded back into practical alinement with the handle itself, thereby rendering the device compact and of convenient form for use as a hoe.

I claim:

1. In a combined hoe and rake, a handle, a hoe member pivoted to said handle, a pair of rake members pivoted to said handle on the opposite side from the hoe and adapted to fold back into position along the handle, and means for simultaneously bringing either the hoe member or the rake members into operative position and for folding the other member into inoperative position.

2. In a combined hoe and rake, a handle, a hoe member pivoted to said handle, a pair of rake members pivoted to said handle on the opposite side from the hoe and adapted to fold back into position along the handle, means including a pair of racks and a common pinion therefor, for simultaneously bringing either the hoe member or the rake members into operative position and for folding the other member into inoperative position.

3. In a combined hoe and rake, a handle section, a second handle section adapted to telescope the first mentioned section, a pivoted rake member secured to the first mentioned section, a pivoted hoe member secured to the opposite side of the first mentioned section, connections between said telescopic handle section and the rake member for moving the latter into and out of operative position, and means actuated by the movement of the telescopic handle section for simultaneously moving said hoe member out of or into operative position.

4. In a combined hoe and rake, a handle comprising an inner and an outer section, said inner section being slotted, a pair of racks and a common pinion disposed within said inner handle section, arms secured to said racks and arranged to project through said slots, a pair of pivotally mounted rake members, means connecting said rake members with one of said arms, a pivoted hoe member on the opposite side of the handle, means connecting said hoe member with the other of said arms and means connecting said outer section with one of said arms.

5. In a combined hoe and rake, a handle comprising an inner and an outer section, said inner section being slotted, a pair of racks and a common pinion disposed within said inner handle section, arms secured to said racks and arranged to project through said slots, a pair of pivotally mounted rake members, means connecting said rake members with one of said arms, a pivoted hoe member on the opposite side of the handle, means connecting said hoe member with the other of said arms, means connecting said outer section with one of said arms, a spring carried within said outer handle section and adapted to bear on the end of said inner handle section and a spring locking means carried by said outer handle section and adapted to lock said outer handle section in its shifted position against the tension of said spring.

HERBERT LEE McKIBBIN.

Witnesses:
B. M. ABERNATHY,
J. E. RUDLOFF.

---

Copies of this patent may be obtained for five cents each, by addressing the "Commissioner of Patents, Washington, D. C."